US010307769B2

(12) United States Patent
Mahshid et al.

(10) Patent No.: US 10,307,769 B2
(45) Date of Patent: Jun. 4, 2019

(54) METHODS AND SYSTEMS RELATING TO DIELECTROPHORETIC MANIPULATION OF MOLECULES

(71) Applicant: THE ROYAL INSTITUTION FOR THE ADVANCEMENT OF LEARNING/MCGILL UNIVERSITY, Montreal (CA)

(72) Inventors: Sara Mahshid, Barrie (CA); Mohammed Jalal Ahamed, Montreal (CA); Walter Reisner, Outremont (CA); Robert Sladek, Montreal (CA)

(73) Assignee: THE ROYAL INSTITUTION FOR THE ADVANCEMENT OF LEARNING/MCGILL UNIVERSITY, Montreal (CA)

( * ) Notice: Subject to any disclaimer, the term of this patent is extended or adjusted under 35 U.S.C. 154(b) by 158 days.

(21) Appl. No.: 15/596,655

(22) Filed: May 16, 2017

(65) Prior Publication Data

US 2017/0326558 A1 Nov. 16, 2017

Related U.S. Application Data

(60) Provisional application No. 62/336,855, filed on May 16, 2016.

(51) Int. Cl.

| | |
|---|---|
| ***G01N 27/453*** | (2006.01) |
| ***B03C 5/02*** | (2006.01) |
| ***B03C 5/00*** | (2006.01) |

(52) U.S. Cl.
CPC .............. *B03C 5/026* (2013.01); *B03C 5/005* (2013.01); *B03C 2201/26* (2013.01)

(58) Field of Classification Search
CPC .................................. B03C 5/02; B03C 5/028
See application file for complete search history.

(56) References Cited

U.S. PATENT DOCUMENTS 6,203,683 B1 * 3/2001 Austin ...................... B01L 7/52 204/547
6,942,776 B2 * 9/2005 Medoro .................. B03C 5/026 204/547

(Continued)

OTHER PUBLICATIONS

Sara Mahshid et al., Development of a platform for single cell genomics using convex lens-induced confinement, Journal Lab on a Chip, vol. 15 Issue 14, pp. 3013-3020.

(Continued)

*Primary Examiner* — Alexander S Noguerola
(74) *Attorney, Agent, or Firm* — Norton Rose Fulbright Canada LLP

(57) ABSTRACT

There is described herein methods and devices for confining and/or manipulating molecules. At least one molecule is introduced into a fluidic chamber. The fluidic chamber is formed inside a device comprising at least one first electrode having a first surface spaced from at least one second electrode having a second surface facing the first surface. The at least one second electrode has a plurality of dielectric structures arranged to form openings along the second surface. At least one electrical signal is applied across the at least one first electrode and the at least one second electrode to generate a non-uniform electric field having electric field lines extending from the first surface of the at least one first electrode to the second surface of the at least one second electrode in the openings formed between the dielectric structures. The at least one electrical signal has a frequency level causing the at least one molecule to move inside the fluidic chamber in accordance with a predetermined movement.

20 Claims, 17 Drawing Sheets

(56) References Cited

U.S. PATENT DOCUMENTS

| | | | | |
|---|---|---|---|---|
| 7,390,388 | B2 * | 6/2008 | Childers | B03C 5/005 204/450 |
| 10,058,865 | B2 * | 8/2018 | Breinlinger | B01L 3/502761 |
| 2013/0099143 | A1 * | 4/2013 | Mogami | G01N 21/6454 250/578.1 |
| 2017/0043343 | A1 * | 2/2017 | Khandros | B01L 3/502761 |

OTHER PUBLICATIONS

Sara Mahshid et al., Sensitive determination of dopamine in the presence of uric acid and ascorbic acid using TiO2 nanotubes modified with Pd, Pt and Au nanoparticles, Journal Analyst, vol. 136 Issue 11, pp. 2322-2329.

Daniel J. Berard et al., Convex lens-induced nanoscale templating, Journal Proceedings of the National Academy of Sciences, vol. 111, pp. 13295-13300.

Sara Mahshid et al., Carbon-Pt Nanoparticles Modified TiO2 Nanotubes for Simultaneous Detection of Dopamine and Uric Acid, Journal of nanoscience et nanotechnology, vol. 11 Issue 8, pp. 6668-6675.

* cited by examiner

Figure 6A
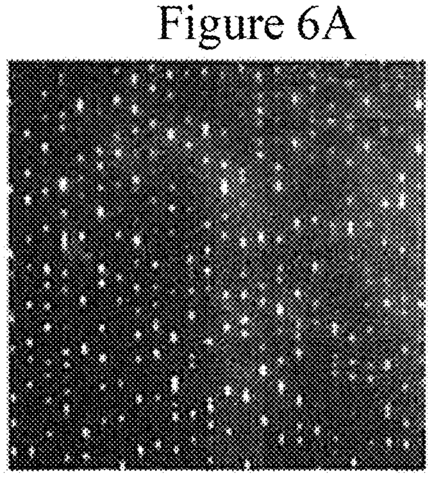
Figure 6B
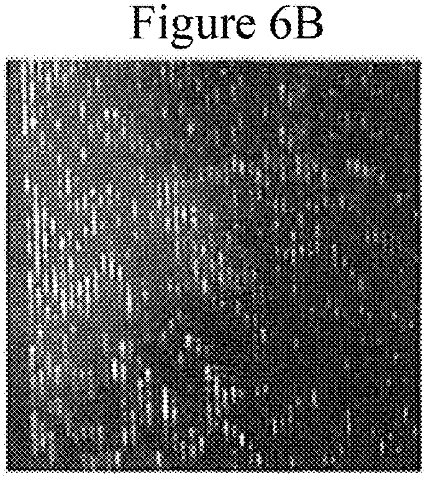
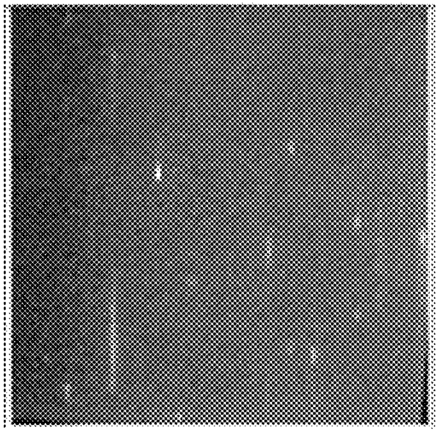
Figure 6C
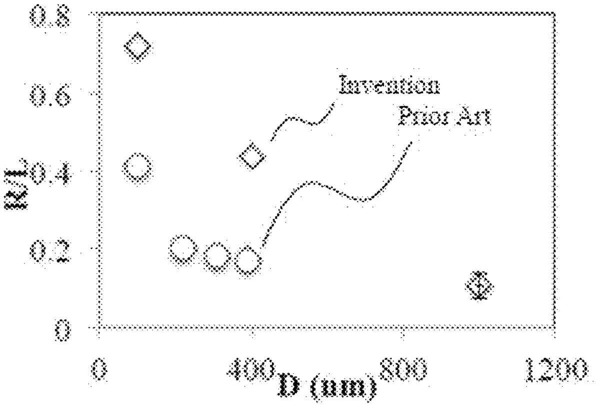
Figure 6D 810 Silicon 820 Silicon Dioxide 830 Photoresist 910 Uncross Linked SU-8

920 Cross Linked SU-8

930 Hydrophobic PDMS

940 Hydrophilic PDMS

950 Sealing Substrate

METHODS AND SYSTEMS RELATING TO DIELECTROPHORETIC MANIPULATION OF MOLECULES

CROSS-REFERENCE TO RELATED APPLICATIONS

The present application claims the benefit of U.S. Provisional Patent Application No. 62/336,855 filed on May 16, 2016, the contents of which are hereby incorporated by reference in their entirety.

TECHNICAL FIELD

This disclosure relates to molecule manipulation and more particularly to devices and methods for the confinement and manipulation of single molecules via nanopatterned electric fields.

BACKGROUND OF THE ART

The confinement of single molecules, e.g. DNA, within nanoscale environments is crucial within a range of research fields including, but not limited to, biomedical research, enhanced genetic diagnosis and physical studies. For example, the direct visualization of an individual stretched DNA molecule allows the acquisition of contextual information along the DNA molecule. It also allow for organisms, in particular microorganisms responsible for disease to be identified without requiring steps such as sample culturing, DNA amplification etc. which today form bottlenecks within prior art diagnostic methodologies.

Single molecule confinement and nanoscale environment manipulation of molecules when coupled to the advancements of technology in nanofabrication offers the potential for high throughput nano-molecular devices for molecular research and development, diagnosis, etc. Nanoscale confinement (nano-confinement) based manipulation of molecules when compared to the prior art single molecule manipulation technique such as tweezer technology and surface/hydrodynamic stretching offers several advantages. First, nanofabrication technologies allow highly parallel devices through integration providing high throughput analysis. Second, they can be easily integrated with nano- and micro-fluidic elements for cycling molecules and allowing upstream/downstream pre- and post-processing.

Within the prior art techniques exploiting nano-fluidics devices single DNA molecules are confined and extended along the nano-channels through the establishment of a pressure gradient along the nano-channel. Depending upon the dimensions of the nano-channel the molecules conformation is molded by the surrounding geometry from a three-dimensional (3D) coil shape to a one-dimensional (1D) extended conformation. However, high hydraulic resistance of the confinement area and free energy barrier at the edge of the nano-channels lead to limited fluid transport and practical nano-channel dimensions. Further, in conventional nano-fluidic technology, high hydrodynamic forces are required to drive the molecules into the nano-channels, potentially leading to fragmentation of large molecules. One prior art approach to overcome these nano-fluidic technology drawbacks is that of Convex-Lens Induced Confinement (CLIC) or Convex Lens-Induced Nanoscale Templating (CLINT) that traps molecules between a nano-patterned substrate and a convex surface. However, CLIC/CLINT limits both buffer exchange for subsequent processes and the concentration of confined molecules within a single field of view. Moreover, confinement varies rapidly above the nano-patterned area from the convex upper surface, limiting the size of the confinement area and the accessibility of the whole device.

Accordingly, it would be beneficial to provide a new technology option that leverages the benefits of nano-scale confinement and nanoscale manufacturing methodologies to provide a means to confine large numbers of molecules within a single field of view. It would be further beneficial to provide a technology allowing for uniform trapping-confinement, extension, and optical observation of single molecules within open and uniform environment without requiring hydrodynamic force, mechanical components or the need for very thin (nanoscale) vertical device dimensions. Further, it would be beneficial for this technology to exploit high volume, low cost automated manufacturing methodologies as well as providing compatibility with nano-fluidic and micro-fluidic technologies for automated processing of samples.

SUMMARY

There is described herein devices and methods for the confinement and manipulation of single molecules via electric fields.

In accordance with a first broad aspect, there is provided a confinement device for molecules. The device comprises at least one first electrode having a first surface, at least one second electrode having a second surface spaced from the first surface of the first electrode and forming a fluidic chamber therebetween, and a plurality of dielectric structures on the second surface arranged to form openings along the second surface, wherein application of an electrical signal across the at least one first electrode and the at least one second electrode generates a non-uniform electric field having electric field lines extending from the first surface of the at least one first electrode to the second surface of the at least one second electrode in the openings formed between the dielectric structures.

In accordance with another broad aspect, there is provided a method for manipulating molecules. At least one molecule is introduced into a fluidic chamber, the fluidic chamber formed inside a device comprising at least one first electrode having a first surface spaced from at least one second electrode having a second surface facing the first surface, the at least one second electrode having a plurality of dielectric structures arranged to form openings along the second surface. At least one electrical signal is then applied across the at least one first electrode and the at least one second electrode to generate a non-uniform electric field having electric field lines extending from the first surface of the at least one first electrode to the second surface of the at least one second electrode in the openings formed between the dielectric structures, the at least one electrical signal having a frequency level causing the at least one molecule to move inside the fluidic chamber in accordance with a predetermined movement.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 6A to 6C depict DNA confinement and extension with varying nano-groove dimensions within molecular confinement devices according to an embodiment of the methodology of FIGS. 2A to 2D;

FIG. 6D depicts DNA extension data as a function of nano-groove geometric dimensions with prior art data;

DETAILED DESCRIPTION

The present disclosure is directed to molecule manipulation and more particularly to devices and methods for the confinement and manipulation of single molecules via electric fields.

The ensuing description provides exemplary embodiment (s) only, and is not intended to limit the scope, applicability or configuration of the disclosure. Rather, the ensuing description of the exemplary embodiment(s) will provide those skilled in the art with an enabling description for implementing an exemplary embodiment. It should be understood that various changes may be made in the function and arrangement of elements without departing from the spirit and scope as set forth in the appended claims.

Within the ensuring description the terms "confine", "confined", "confinement" etc. are employed with respect to molecules within exemplary embodiments. These terms are intended to imply that the molecules are restrained, positioned, held, etc. by the dielectrophoretic (DEP) forces upon the molecules arising from the electric field(s) applied to the electrode(s) of the structures described. Absent the applied electric field(s) and molecular capture agents or materials/binding on the surface of the devices such molecules would generally be mobile/free within the structures defined. Similarly, the use of terms such as "captured" and "capture" within the ensuring description are intended to imply the retention of the molecules through the DEP effect absent molecular capture agents or materials/binding etc.

Within the description generally, and more specifically with respect to FIGS. 2A to 6D, reference is made to a DNA molecule or DNA molecules, namely single or multiple molecules of deoxyribonucleic acid (DNA). However, the methodologies, devices, techniques, designs, etc. described and presented herein may be applied to a wide range of molecules which may relate to living organisms, biochemistry, molecular biology, molecular engineering etc., including, but not limited to, biological macromolecules such as proteins, nucleic acids, carbohydrates, and lipids.

Figure 1A:
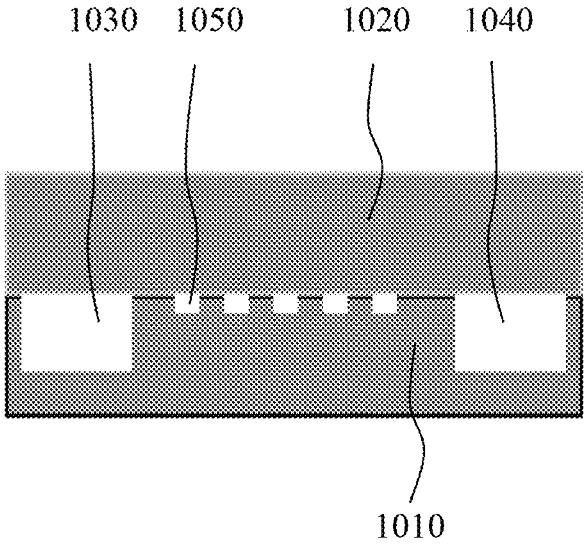
Figure 1A (Prior Art)
FIGS. 1A to 1D depict DNA confinement methodologies according to the prior art.
Figure 1B:
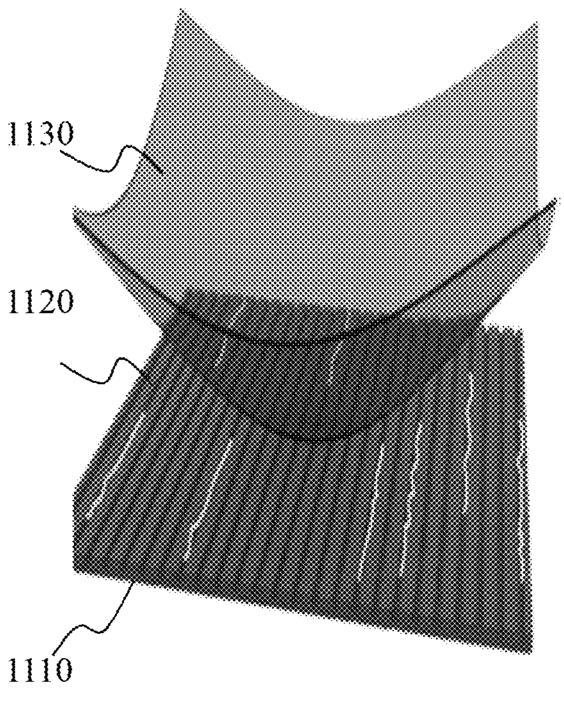
Figure 1B (Prior Art)

Referring to FIGS. 1A and 1B, there are depicted prior art techniques of pressure loading and CLIC/CLINT, respectively. In FIG. 1A, DNA molecules are loaded into nano-channels 1050 within a nano-fluidic structure formed from a top plate 1020 and bottom plate 1010 through a pressure gradient across the nano-fluidic structure from a source reservoir 1030 to a drain reservoir 1040. Within this classic nano-channel approach, DNA molecules are driven from the reservoir 1030 via a micro-channel loading channel into the nano-channel 1050 array where the molecules are trapped and unspooled, creating a one-to-one correspondence between sequence position and spatial position along the extended molecule. With appropriate sequence-specific fluorescent labeling chemistry, a barcode can then be formed and read off from the nano-channel extended molecule. The advantages of this nano-fluidic approach over older alternatives based on surface capture lies in its high-throughput as many nano-channels can be packed into a single-field of view of the optical system reading the fluorescent labels and, as the molecules are mobile, they can be cycled in and out of the array.

However, the approach faces several drawbacks. Firstly, loading DNA into the nano-channel arrays is challenging and requires the use of high-pressure and/or sophisticated inlet designs to overcome the large free energy barrier at the channel inlet. Further, the nano-channels have high hydraulic resistance relative to the rest of the device, reducing molecular flow to the arrays. These considerations overall lead to a lower utilization of the nano-channel arrays and a consequently lower throughput (defined here as the number of molecules mapped per field of view per camera integration time). Additionally, the loading process can fragment long molecules and the smaller the nano-channel, the more significant these problems become, obviating efficient use of nano-channels that lead to maximum stretching, i.e. those below 40 nm. Secondly, for suitably high-statistics, the nano-channel approach requires concentrated solutions containing high molecular weight DNA, requiring complex and specialized sample-preparation approaches. Thirdly, such nano-channel designs are not capable of holding molecules immobile during buffer exchanges, so that biochemical modifications cannot be readily performed when the molecules are extended in the nano-channels, i.e. the molecules will be pushed out of the arrays during buffer exchanges. Finally, while it has proved effective for ensemble mapping applications, e.g. mapping DNA purified from pools of cells, the nano-channel approach poses significant challenges in terms of single-cell mapping, due to the large difference in hydraulic resistance from the nano-channel arrays to microfluidic channels with dimensions appropriate for handling cells.

In FIG. 1B, a CLIC/CLINT design is presented representing an alternate technique exploiting a deformable top loading concept. A deformable cover 1130 is deformed towards a substrate 1110 comprising nano-channels 1120. Accordingly, as the deformable cover 1130, or alternatively a shaped cover, is brought towards the substrate 1110, the gap between them decreases in a defined manner allowing DNA molecules to be confined therebetween. This approach has also been employed in cell/molecule dimensional characterization within the prior art. However, these approaches create high shear flows, leading to breakage of the molecules and they are even more difficult to integrate with microfluidics than the classic nano-channel approach. Further, these top loading concepts, as opposed to the nano-fluidic side loading concepts, suffer from low throughput, non-uniform confinement as well as requiring mechanical components which are difficult to control as well as resulting in confinement structures that again make buffer exchange difficult.

Figure 1C:
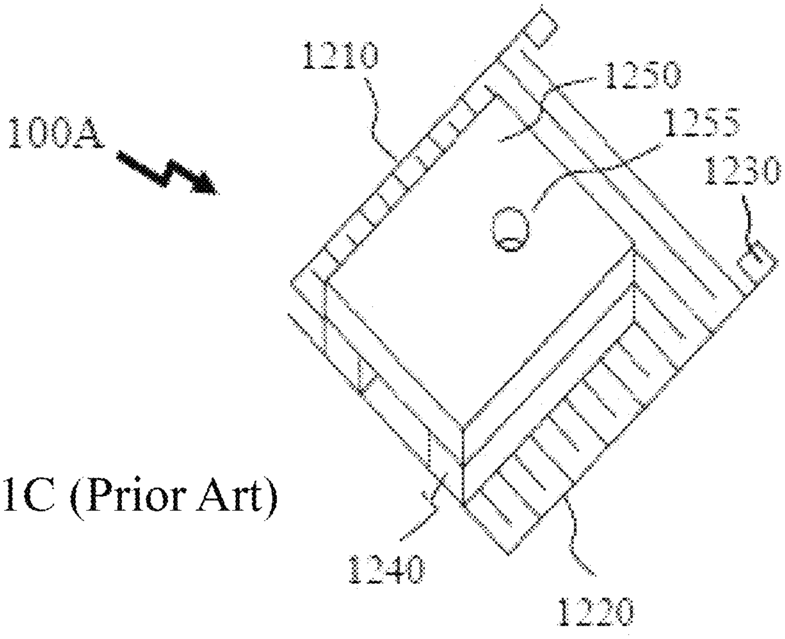
Figure 1C (Prior Art)
Figure 1D:
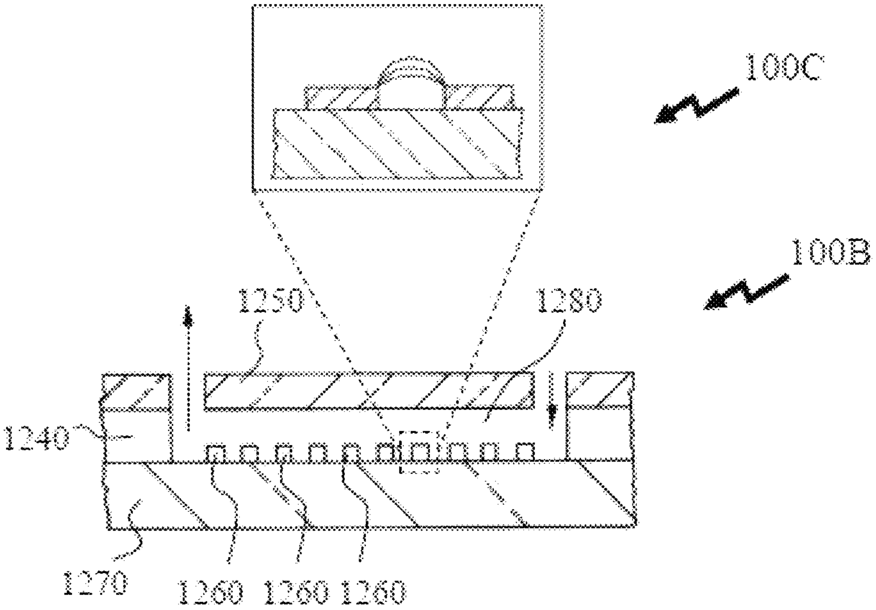
Figure 1D (Prior Art)

In contrast to these other approaches, dielectrophoresis (DEP) exploits the force exerted upon a dielectric material when it is subjected to a non-uniform electric field. Originally employed for the separation of cells, e.g. cancerous from non-cancerous cells, and concentration the methodology was extended by Krulevitch et al. in U.S. Pat. No. 6,352,838 entitled "Microfluidic DNA Sample Preparation Method and Device" as depicted in FIGS. 1C and 1D. A series of interdigitated electrodes become entrapped in the high field gradients at the electrode tips as depicted in 100C. As depicted in perspective view 100A and cross-section 100B, the approach employs first and second interdigitated electrode arrays 1210 and 1220 upon a substrate 1270 which are electrically connected via pads 1230 to electrical excitation circuits, not shown for clarity. Disposed above these is cover 1250 with ports 1255 allowing the specimen to be flowed through these into the region 1280 between the cover 1250 and substrate 1270. Accordingly, the electrodes 1260 with the appropriate electrical signals applied to the first and second interdigitated electrode arrays 1210 and 1220 generate the high electric fields at the electrode tips (corners) confining the DNA molecules through DEP. The cover 1250 and substrate 1270 are separated by a predetermined thickness through use of the appropriate spacers (or shims) 1240.

There is presented herein methods and systems wherein, through the combination of dielectrophoresis force and appropriate material selections, single DNA molecules are uniformly trapped, extended and optically observed in an open and uniform confinement without the requirement for hydrodynamic forces or mechanical components. Most biological cells and macromolecules behave as dielectric particles in external AC electrical fields giving rise to developed devices in biological studies for cell manipulations and separation techniques. In common with other charged particles in solution, DNA possesses a counter ion cloud which is responsible for its large polarizability at low frequency, f≈10 kHz.

In accordance with some embodiments, there is provided a device design methodology employing engineered nano-grooves of a lower electrode with patterned dielectric insulators atop in conjunction with an upper electrode. In one embodiment, an optically transparent indium tin oxide (a solid $In_2O_3$—$SnO_2$ solution, commonly referred to as ITO) lower electrode is employed in conjunction with silicon nitride ($Si_3N_4$) insulator structures. The DEP force is generated between this nano-patterned ITO-$Si_3N_4$ substrate (bottom electrode) and an ITO coated cover (top electrode), separated by predetermined spacers/shims which are connected to an AC power supply. Based upon the predetermined spacers/shims, a gap exists between the two electrodes for introducing the buffer medium for initial DNA molecule entrapment and subsequent ease of buffer exchange for cleaning the system, flushing prior to measurements/analysis, post-processing the contained DNA molecules, etc.

The applied AC voltage, within a specific range of frequencies, generates the DEP force between the top ITO electrode and the nano-grooves with ITO floors. In this manner the DEP force drives the DNA molecules into the nano-grooves where they align along the field lines extending to the bottom of the grooves. Accordingly, by appropriate design and excitation, the DNA molecules experiencing the DEP forces are subject to high fields and strong, localized field-gradients which vary on scales comparable to the strand length. The DEP force is defined by the applied field and frequency according to DEP Equation (1), where K is the Clausius-Mossotti factor relating a dielectric field of a first permittivity, $\varepsilon_1$, and particle (representing the effective dipole within the DNA molecule) of second permittivity, $\varepsilon_2$.

$$F=2\pi R^3\varepsilon_1\lfloor Re[K(\omega)]\rfloor\nabla E^2 \quad (1)$$

Figure 2A:
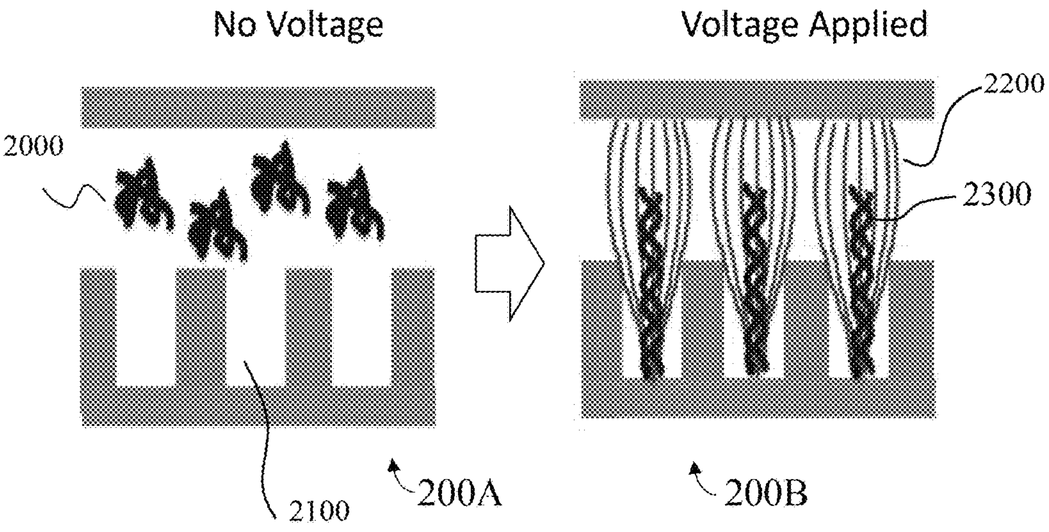
FIGS. 2A to 2D depict the molecular confinement methodology according to some embodiments described herein.

In FIG. 2A, an initial cell 200A at no voltage is depicted wherein the DNA molecules are folded (folded DNA 2000). With application of the electrical signal, the electric field 2200 is established which "directs" the DNA molecules into the nano-structures (e.g. nano-grooves, nano-pits or other nano-structures) such that the DNA unfolds into extended DNA 2300, and aligns along the electric field 2200.

Figure 2B:
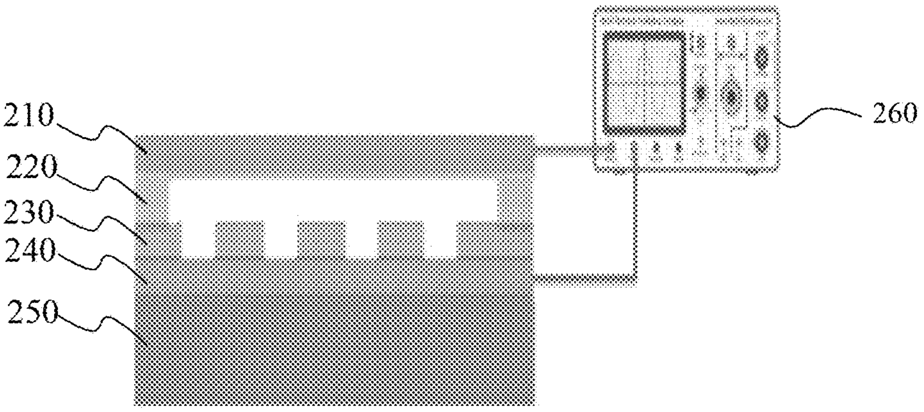
Figure 2C:
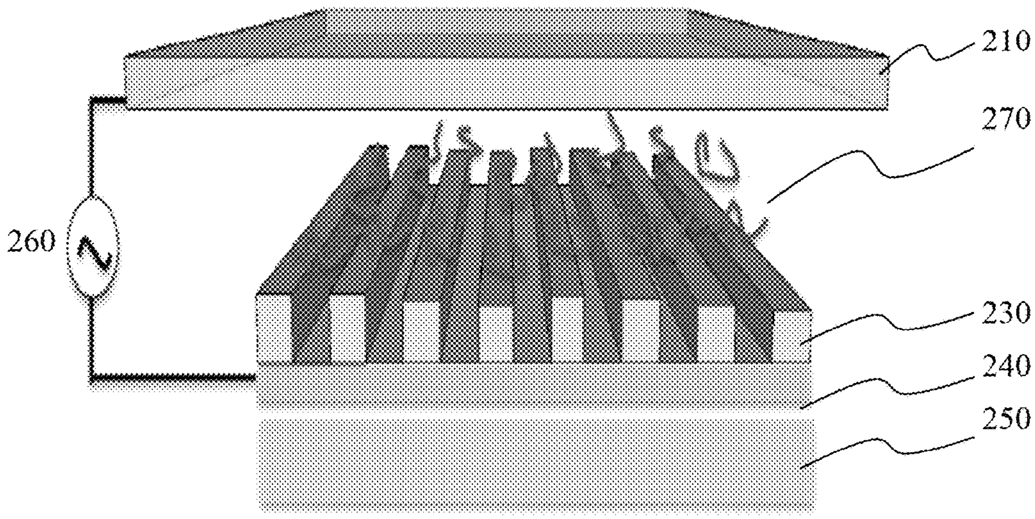
Figure 2D:
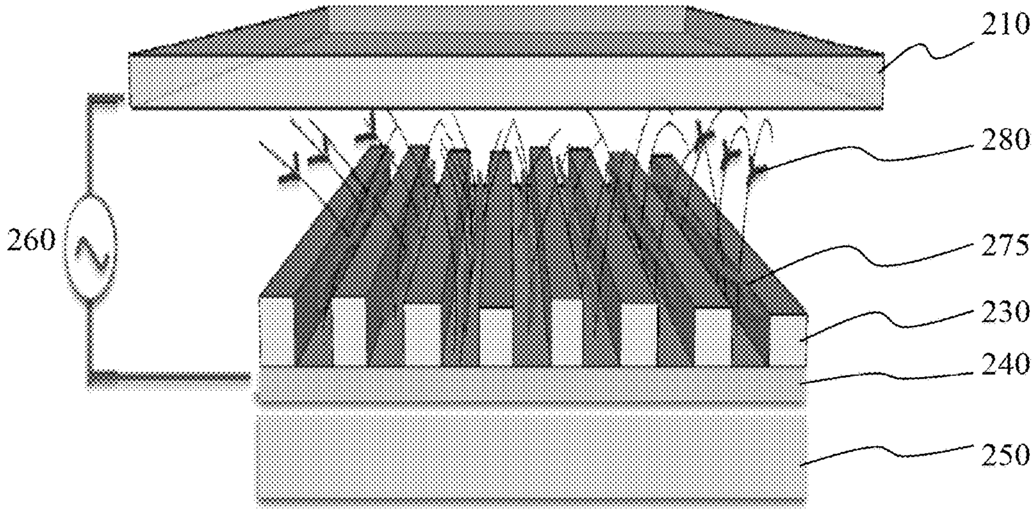

Referring to FIG. 2B, there is depicted a schematic of a device according to an embodiment, comprising a substrate 250, lower electrode 240, patterned dielectric 230, spacer 220, and upper electrode 210. As depicted, the lower and upper electrodes 240 and 210 respectively are connected to an electrical source 260. The device is depicted schematically in perspective in FIGS. 2C and 2D respectively, with and without an applied electrical signal, showing the DNA folded 270 and unfolded 275 through the action of the electric field 280.

According to Equation (1), the particle will be attracted or repelled from a region of strong electric field intensity based upon whether Re[K(ω)]>0 (i.e. $\varepsilon_2(\omega)>\varepsilon_1(\omega)$) or Re[K(w)]<0 (i.e. $\varepsilon_1(\omega)>\varepsilon_2(\omega)$). Accordingly, by varying the frequency of the applied electric field, different molecules can be selectively attracted or repelled from the regions of high electric field. Accordingly, variations in the molecular dipole can be exploited to sort/filter molecules.

COMSOL Multiphysics Software simulations were used to establish the numerical models for the AC electric field within the devices according to some embodiments. As depicted schematically in FIG. 2D, the field lines 280 extend from the ITO upper electrode 210 down to the bottom of the nano-grooves and the ITO lower electrode 250 with the $Si_3N_4$ patterned dielectric 230. Simulation models employed channels (nano-grooves) with a conductive bottom surface and insulating walls to represent the ITO and $Si_3N_4$ layers, respectively. Accordingly, with the COMSOL software, the electrostatic equation was solved in time dependent form. The simulation results (illustrated in FIG. 3D) indicate the direction of the field lines as being along the nano-grooves from upper electrode 210 to lower electrode 250.

In some embodiments, ITO may be employed as an optically transparent and electrically conductive material. For example, combining ITO electrodes with transparent upper and lower mechanical elements of the devices provides for an optically transparent nano-groove DNA single molecule confinement device allowing direct visualization. In such an embodiment, the transparent upper and lower mechanical elements may be a biologically inert optically transparent glass or plastic, for example. In this manner fluorescence microscopy may be used to capture digital image sequences as the threshold voltage and frequency are applied and varied. Dielectrophoresis (DEP) applied to DNA molecules within open and top-loading nano-confinement environments may be used in genomic applications of DNA confinement.

In some embodiments, the main surface of the imaging chamber contains nanoscale and sub-microscale features which are patterned on $Si_3N_4$ insulator coated on the ITO/glass layer, referred to as the bottom electrode. A 30 μm double-sided tape was employed to separate the bottom electrode and the top ITO coated glass coverslip (upper electrode). This was then laser-cut in order to create channels for the liquid to flow into a main central chamber. Small holes were sand-blasted into the corners of the device for fluid injection and buffer exchange. The whole device was then mounted on a modified microscope chuck and mounted to the microscope for imaging. Imaging was performed on a Nikon Ti-E inverted microscope equipped with a Nikon 100× oil-immersion objective and a high speed CCD camera. Chemically inert PTFE tubing are used to insert and retrieve the fluid from the imaging chamber, facilitating buffer exchange. The conductive ITO electrodes were connected to the AC power supply through copper tape conductive paths. Within the DEP experiments, the frequency and voltage were adjusted/monitored through an oscilloscope connected to the AC power supply. Using the chuck assembly and syringe pump, a solution containing fluorescently labeled lambda DNA were loaded from one side of the device.

With the application of AC voltages at frequencies $f>1$ kHz the DNA molecules start to oscillate within the gap between upper and lower electrodes, indicating the generation of the field along the ITO "paths", i.e. those regions of the lower ITO electrode not covered with the dielectric. With increases in the frequency of the applied electrical signal, single DNA molecules align along the nano-patterned ITO "paths"/nano-grooves. The DNA molecules may be "driven" out of the nano-grooves by decreasing the electrical drive signal frequency to lower frequencies. Accordingly, DEP-based confinement with frequency-dependent assisted confinement/loading/unloading is achieved. Once the DNA molecules are confined inside the nano-grooves, their genomic content can be established via sequence-specific labeling and denaturation mapping, for example.

A 100 mm diameter 500 μm thick fused silica wafer was first initially cleaned using piranha etch, sulphuric acid ($H_2SO_4$) and hydrogen peroxide ($H_2O_2$), used to remove organics after which the wafer was aligned with a pattern of ~50 nm Cr—Au metallization alignment marks. These were patterned using standard UV lithography, Cr—Au sputtering, and lift-off in order to allow subsequent division of the fully fabricated wafer into 9 individual dies of width 25 mm (1"). The lower electrode was formed initially by RF sputtering 100 nm from an InSn target followed by the $Si_3N_4$ insulator layer which was deposited by plasma enhanced chemical vapor deposition (PECVD) using a $SiH_4$, $N_2$, $NH_3$ chemistry. The nanostructures are defined via electron-beam lithography and dry reactive ion etching (RIE) the $Si_3N_4$. In some embodiments, 250 μm long arrays of nano-channels were implemented with widths ranging 100 nm$<W<$1000 nm with different spacings as defined using electron beam lithography. These nano-channels patterns then transferred to the $Si_3N_4$ layer via $CF_4$:$CHF_3$ RIE. The etching durations were determined such that the patterned $Si_3N_4$ was completely etched but the ITO layer is barely exposed.

Figure 3A:
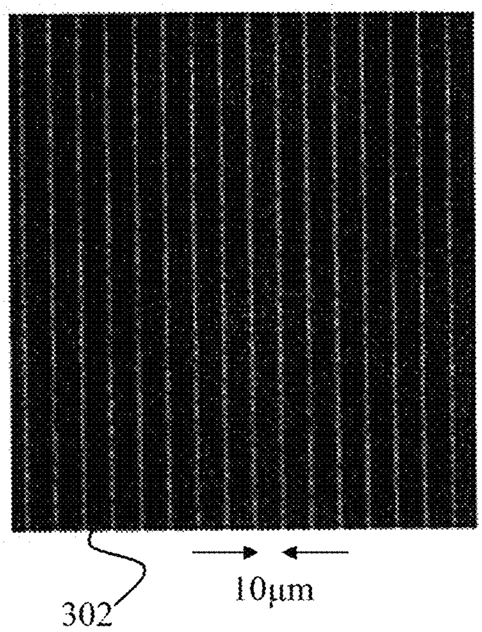
FIGS. 3A, 3B, and 3C depict SEM images of nano-grooved/nano-pit surfaces for molecular confinement devices according to an embodiment of the methodology of FIGS. 2A to 2D in plan and cross-section respectively.
Figure 3B:
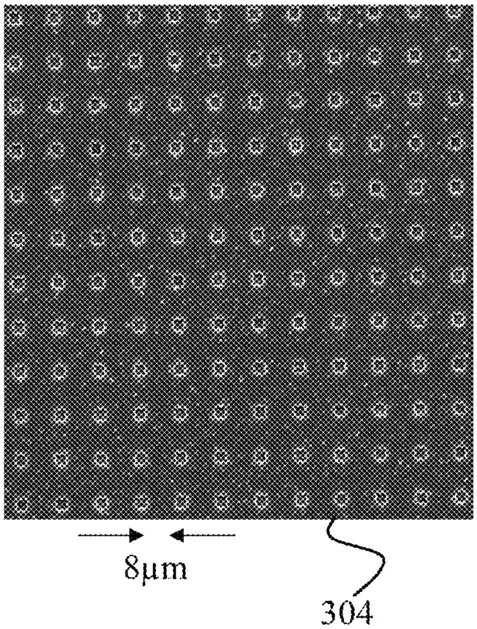
Figure 3C:
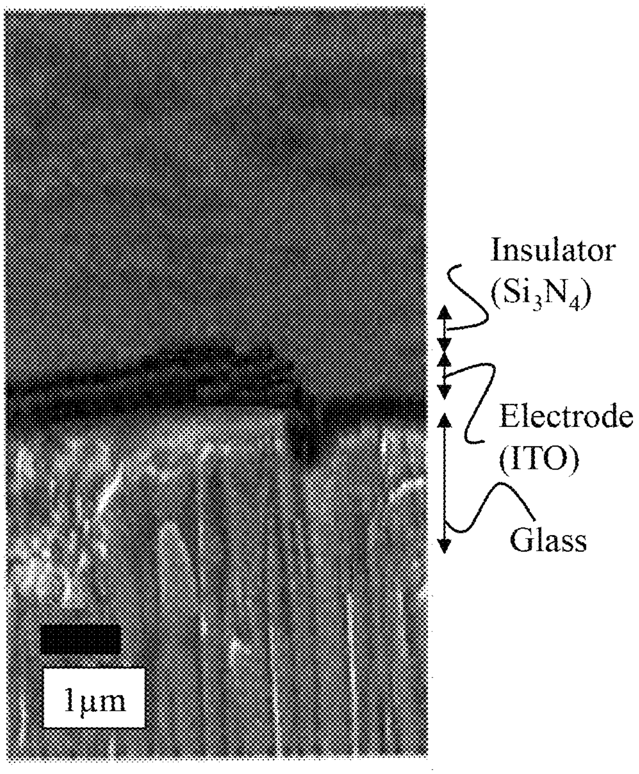
Figure 3D:
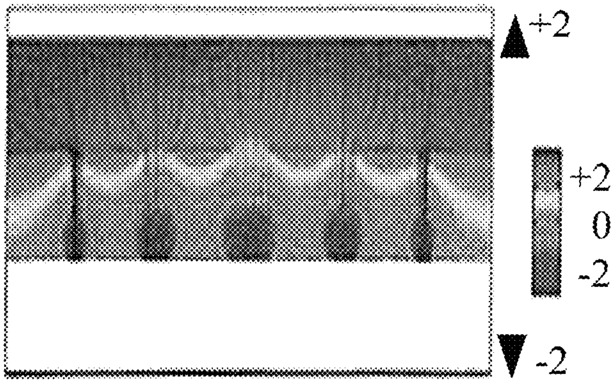
FIG. 3D depicts numerical simulation results showing the vertical electric field between the top and bottom electrodes for a molecular confinement device according to an embodiment of the methodology of FIGS. 2A to 2D.
Figure 3E:
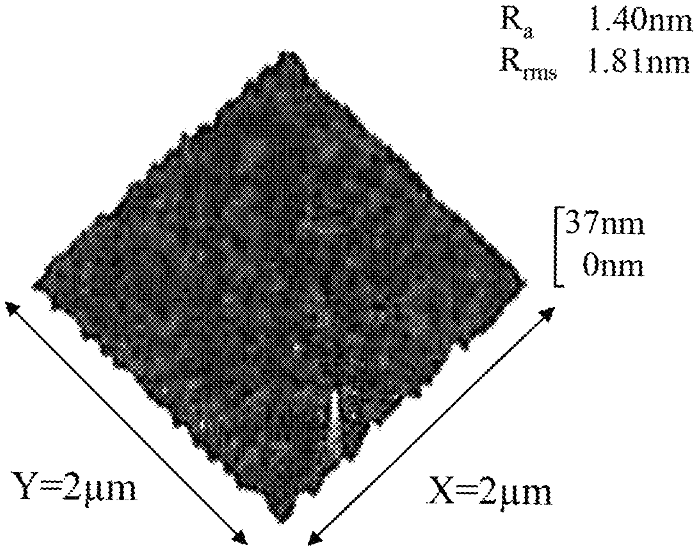
FIG. 3E depicts AFM results for an indium tin oxide (ITO) electrode for a molecular confinement device according to an embodiment of the methodology of FIGS. 2A to 2D.

Referring to FIGS. 3A-3C, there are depicted SEM plan and section images of etched nanostructures in $Si_3N_4$. FIGS. 3A and 3B depict nano-channels 302 and nano-pits 304 respectively. The three individual layers of $Si_3N_4$/ITO/fused silica glass are shown within FIG. 3C. FIG. 3D illustrates simulation results to show the direction of the field lines as being along the nano-grooves from upper electrode 210 to lower electrode 250. FIG. 3E depicts AFM results for the ITO electrode indicating acceptable roughness of ~1.8 nm with electrical resistance of approximately 3 kΩ. In some embodiments, the upper electrode and lower electrode portions can be temporarily bonded or alternatively microfluidic motion and flow can be employed in order to flow the sample into the confinement region. Further, the adjustable confinement defined by the frequency of the applied signal allows the confinement to be increased once the sample is loaded, held for subsequent visualization and post-confinement processing, and then the confinement can be reduced and removed. Accordingly, conventional micro- and nanofluidics can be employed for sample movement, reagent addition, etc.

The DNA employed within experiments described and presented below were λ-Phage DNA (λ-DNA) of length 48,502 base pairs which were stained for visualization with a green fluorescent monomethine cyanine dye, YOYO-1, at a 10:1 intercalation ratio. YOYO-1 was selected as it is known to increase the full contour length of DNA, for example, at this staining ratio from 16.5 μm to 19.0±0.7 μm for λ-DNA. The buffer used was 0.5×TBE which is a solution of 45 mM tris(hydroxymethyl)aminomethane base (commonly referred to as Tris-base), 45 mM boric acid ($H_3BO_3$) and 1 mM ethylenediaminetetraacetic acid (ETDA). The DNA sample concentration was 50 μg/mL. Occasionally 3% (vol/vol) Beta-mercaptoethanol (BME) was added as an anti-photo bleaching agent.

Figures 4A, 4B, 4C, 4D:
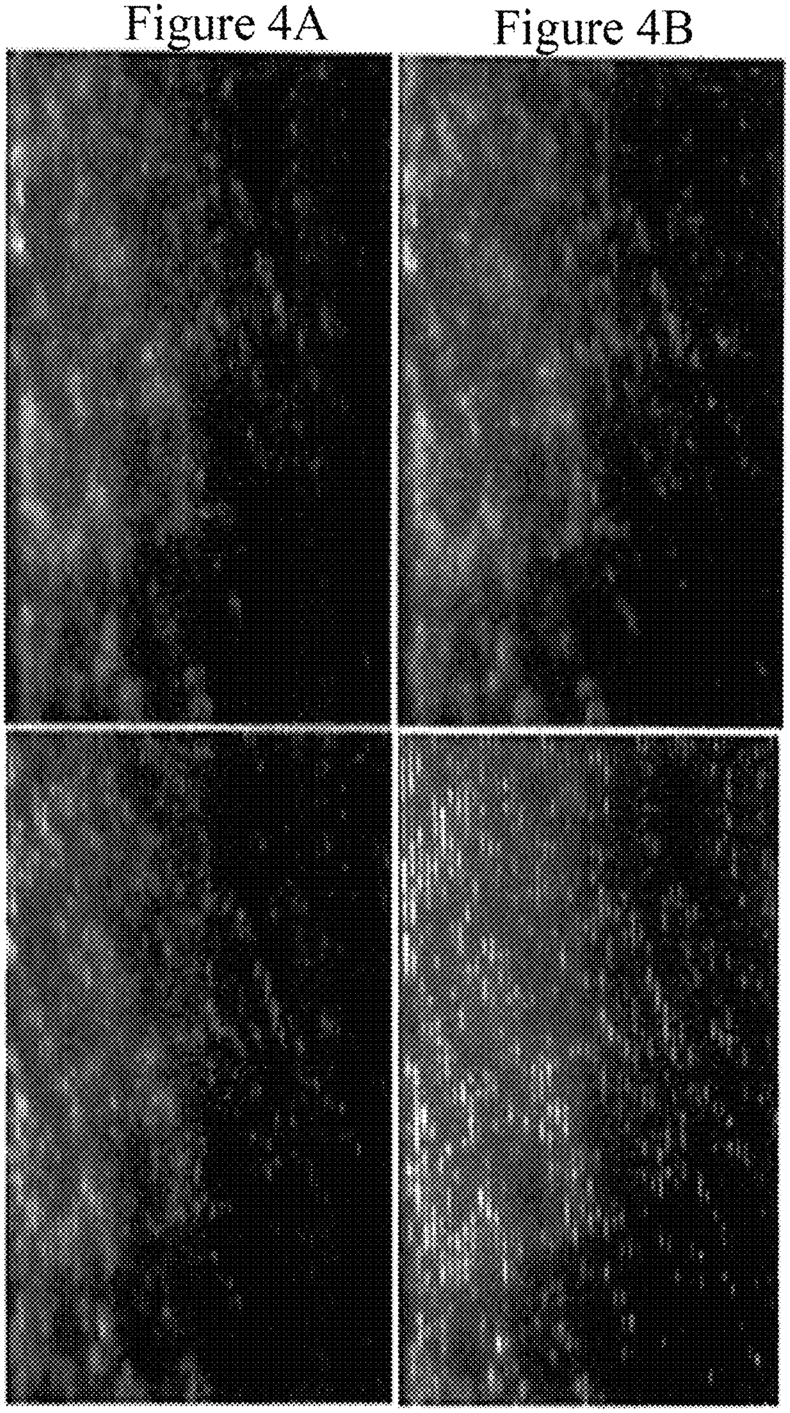
FIGS. 4A to 4D depict fluorescent images of lambda-Phage DNA confined within a molecular confinement device according to an embodiment of the methodology of FIGS. 2A to 2D with 2V driving signal at different applied frequencies.

Fluorescent imaging of trapped λ-Phage DNA molecules within square nano-grooves of dimensions ranging from 100 nm to 1.5 μm has been achieved. Referring to FIGS. 4A to 4D, there are depicted fluorescent images of DEP confined λ-DNA at an applied voltage of 2V across the device as a function of frequency. The frequencies are 8 kHz in FIG. 4A, 12 kHz in FIG. 4B, 18 kHz in FIG. 4C, and 22 kHz in FIG. 4D, where each image covers an area of 80μ×80 μm and is imaged for 80 ms. Accordingly, at 8 kHz in FIG. 4A, no trapping occurs, the DNA molecules are tangled, and a bright blurry solution of fluorescently labeled DNA is imaged. As the frequency is increased, confinement occurs that drives the DNA from the region above the ITO nano-grooves into the ITO nano-grooves, as shown from FIGS. 4B to 4D respectively. As illustrated in FIG. 4D, the DNA molecules are confined and are now in focus and they diffuse in the nano-grooves as long as the AC voltage is applied. The electric field lines within the 4 μm distance between the nano-grooves results in a powerful confinement of the molecules. The DEP force increases with frequency for λ-Phage DNA molecules.

Figure 5A:
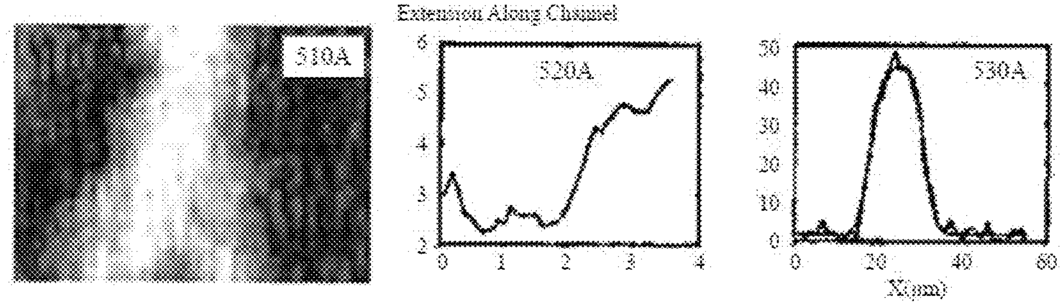
FIGS. 5A to 5C depict kymographs and corresponding steady-state ramp profiles and linear ramp fits for a single DNA molecule at different frequencies for a 2V driving signal within a molecular confinement device according to an embodiment of the methodology of FIGS. 2A to 2D.
Figure 5B:
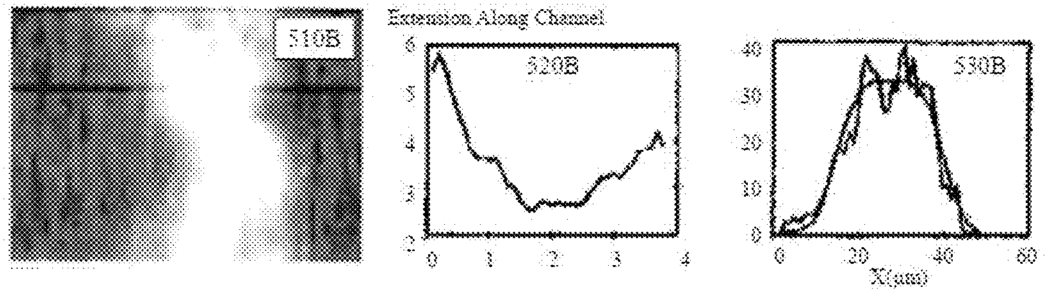
Figure 5C:
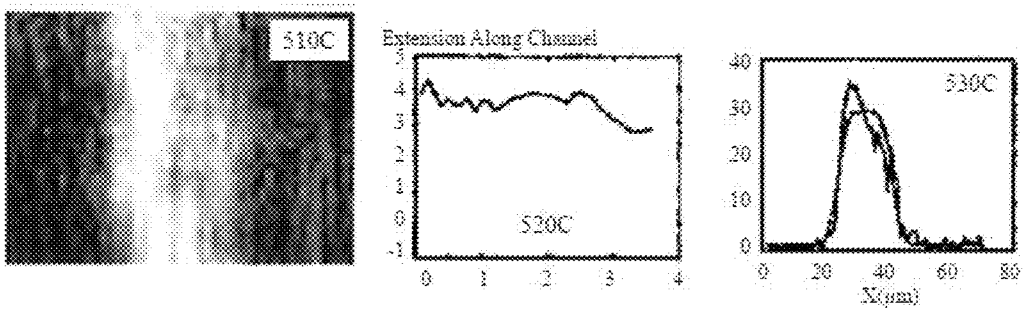

In order to characterize the DEP confinement of the DNA molecules as a function of frequency and geometry of the electrodes, video sequences were taken at 12.5 frames per second of duration 40 seconds (500 frames) at different AC drive frequencies in combination with grooves of different size. From these video sequences, three different behaviors of DNA molecules were observed with frequency and applied electric field. The DNA extension varied with frequency along the nano-grooves and the DNA extension was visualized. Referring to FIGS. 5A to 5C there are depicted kymographs (510A, 510B, 510C) and corresponding steady-state ramp profiles (520A, 520B, 520C) with linear ramp fits (530A, 530B, 530C) for the DEP behaviour of a single DNA molecule. Referring initially to FIG. 5A there is depicted an extension event where the DNA molecule is stretched to almost two times its confined length. FIG. 5B depicts a compression and re-extension with frequency. Further, in FIG. 5C, there is depicted a single DNA molecule restricted in a confined position for a longer time in the focal plane, permitting continuous monitoring and probing of the single molecule. The intensity profile of the extended DNA molecule along the channel shows a Gaussian step function.

FIGS. 6A to 6C depict DNA extension as a function of nano-groove size for 100 nm (FIG. 6C), 400 nm (FIG. 6B) and 1 μm (FIG. 6A). As shown, the DNA molecules are more extended within the 100 nm nano-grooves than they are within 400 nm and 1 μm nano-grooves at a constant frequency of 22 kHz. The longest molecule is 14.8 μm within the 100 nm nano-grooves in FIG. 6C. This extension decreases to 8.8 μm and 2.24 μm within the 400 nm and 1 μm respectively in FIGS. 6B and 6A. The lengths of these extended DNA molecules relative to the full stretched length of λ-Phage DNA (16.5 μm), as obtained in the prior art, is depicted in FIG. 6D.

As outlined supra in respect of FIGS. 2A to 6D, a device and methodology is presented herein for the confinement of molecules exploiting the dielectrophoretic (DEP) force which is applied between two parallel vertically spaced electrodes, to reversibly capture, manipulate and concentrate single macromolecules (such as DNA) on a surface. The device is purely electrostatic in nature, based on the principle that polarizable molecules feel a force proportional to the gradient of the squared magnitude of the electric field (DEP-force). The upper and lower surfaces provide a region supporting microfluidic flow with the electrodes on each whilst the nano-patterned dielectric layer on top of a transparent electrode on the lower electrode provides a series of conductive nano-features, leading to an enhanced local electric field magnitude and consequently high DEP-force. The DEP-force allows for the macromolecules to be driven into the nano-features and then confined within them, forcing the molecules to adopt a conformation determined by the local geometry of the patterning, including stretched conformations (in one-dimensional (1D) nano-grooves) and concentrated trapped conformations (quasi zero-dimensional (0D) cavity patterns). The methodology allows for reversible macromolecular surface capture, and molecules can be loaded and then ejected from the surface features by simply tuning the frequency of the applied AC electric field. Further, the device can concentrate molecules as well as manipulate them, leading to higher throughput at lower molecule concentrations. Finally, the device does not have to be of nano-scale or even micro-scale in the vertical dimension, as the loading is induced by the DEP-force onto nano-structured lower surface. For example, reversible capture, concentration and stretching of DNA molecules in 300 nm×300 nm groove-like electrode wells was demonstrated within a 30 μm thick flow-chamber.

This allows the creation of devices having simpler buffer exchanges, a lower risk of clogging, and in some design variants no need for permanent bonding of the upper electrode to the lower electrode. The ease of fabrication and instrumentation may make such devices point of care instruments for single-cell genomic analysis. Such devices will facilitate genomic studies based on single-molecule DNA mapping and improve the performance of existing second and third generation sequencing approaches.

As noted supra, depending on the pattern that is exposed within the lower surface, long quasi D-electrode wells for stretching, quasi 0D cavity-like wells for local trapping, or wells of arbitrary geometries can be formed. The DEP force is generated between the top and bottom substrates by connecting them to an AC power supply. A pure AC-signal is used as the presence of a DC component will lead to electrophoresis, overwhelming the dielectrophoretic effect. The two surfaces are separated by a spacer that can be of arbitrary dimension, creating a flow-cell for introducing buffers or biochemical solutions. When the AC voltage is applied with a frequency on the order of the relaxation time of the counter ions screening the molecule, a DEP force will be generated, driving the molecules into regions of high field concentration. In particular, this field will guide the molecules into the electrode-wells and then force them to adopt the local well geometry, for example leading to stretching in nano-groove-like wells. Accordingly, the molecule being confined can, in some embodiments, be selected based upon the applied AC signal frequency, DEP-based methodologies according to some embodiments may provide improved loading efficiency of zero-mode waveguide nano-reactors used in DNA sequencing, potentially by an order or orders of magnitude. DEP-based methodologies according to some embodiments may, for example, improve loading efficiency for nanopore based approaches Within the descriptions supra in respect of exemplary embodiments, a fused silica substrate was employed which provides an optically transparent substrate in conjunction with a fused silica cover plate for an optical transparent cover. In instances of transparent substrates, optical microscopy may be performed through the substrate as well as optical illumination and/or optical excitation. Similarly, with transparent covers, optical microscopy may be performed through the cover as well as optical illumination and/or optical excitation. In some embodiments, one and/or others may be employed.

Alternatively other transparent materials may be employed for substrate and/or cover including, but not limited to, sapphire, soda lime glass, single crystal quartz, borosilicate glass, and fused quartz. In other instances, non-transparent, semi-transparent or coloured substrates and/or covers may be employed including, but not limited to, silicon, alumina ($Al_2O_3$), aluminum nitride ($Al_3N_4$), silicon-on-sapphire, and silicon carbide. According to the maximum temperature experienced by the substrate during electrode deposition, dielectric deposition, and etching then high temperature plastics may also be employed. Similarly, with the cover based upon the maximum temperature experienced by the substrate during electrode deposition, high temperature plastics may also be employed. Examples include, but are not limited to, polyamide, Polytetrafluoroethylene (PTFE), polyetheretherketone (PEEK), polyphenylene-sulphide (PPS), polyamide-imide, polyimide, and polydimethylsiloxane (PDMS).

Within the embodiments described supra, silicon nitride ($Si_3N_4$) was employed as a dielectric to form the nano-grooves atop the lower ITO electrode. However, other dielectric materials may be employed to provide these nano-structures. The material or materials employed may be selected based upon processing requirements of the manufacturing process employed in combination with the biological materials, reagents, solvents, etc. employed in capturing one or more molecules and any pre-processing/post-processing etc. Accordingly, other dielectric materials may be employed including, but not limited to:

- undoped or doped silicon oxide ($SiO_2$), doping may, for example, be carbon or fluorine;
- silicon oxynitride ($SiO_xN_y$);
- spin-on organic polymeric materials including, but not limited to, polyimide, polynorbornenes, benzocyclobutene, and PTFE;
- spin-on silicon based polymeric materials including, for example, hydrogen silsesquioxane (HSQ) and methylsilsesquioxane (MSQ); and
- spin-on glass/sol-gel materials including, for example, tetraethylorthosilicate ($Si(C_2H_5)_4$ or TEOS) and tetrapropylorthotitanate ($Ti(OC_3H_7)_4$ or TPOT).

The descriptions supra in respect of exemplary embodiments describes nano-confinement structures for molecules, e.g. the DNA molecules, that employ ITO as the conductor for the upper and lower electrodes in the provisioning of the DEP field. However, a range of other electrode materials may be employed, selected based upon processing requirements of the manufacturing process employed in combination with the biological materials, reagents, solvents, etc. employed in capturing one or more molecules and any pre-processing/post-processing etc. Further, in some embodiments, the requirement for an optically transparent electrode may not be present. Accordingly, other electrode materials may be employed including, but not limited to, gold, chromium, aluminum, silver, platinum, nickel, copper, rhodium, palladium, tungsten, palladium, and combinations of such materials. Other electrode configurations may employ, for example, a chromium adhesion layer and a gold electrode layer or other combinations of metals such as adhesion layer, body of electrode and passivation/protection layer. In some embodiments, electrodes may be provided in order to heat the nano-structure environment.

Within the embodiments described supra, the lower electrode within the regions between the dielectric has been primarily described as being "bare" or exposed although the potential to pattern/add capture materials has been described. However, in other embodiments, the lower electrode in these exposed regions may be coated with a layer, typically thin, of a dielectric material in order to remove/reduce effects including, but not limited to, fouling of the target molecule or other molecules present within the introduced fluidic sample onto the electrode(s) and reaction of the electrode(s) with one or more components of the introduced fluidic sample. Within other embodiments, the upper electrode(s) may be similarly coated with a layer, typically thin, of a dielectric material in order to remove/reduce such effects. This dielectric may be the same, in some embodiments, as the dielectric forming the nano-structures, whilst in other embodiments this dielectric material may differ from that forming the nano-structures due to the requirements of the electric field within these electrode regions. In some embodiments, this additional dielectric may be coated onto the nano-structure dielectric as well as the electrode(s) metallization, e.g. a thin spun-on or deposited conformal coating.

The descriptions supra in respect of exemplary embodiments describes nano-confinement structures for molecules, e.g. the DNA molecules, that employ ITO as the conductor for the upper and lower electrodes in the provisioning of the DEP field. However, the high cost/limited supply of indium and the fragility and lack of flexibility of ITO layers may mean alternatives are appropriate. Amongst these are:

- carbon nanotube conductive coatings;
- graphene films which are flexible and have been shown to have (~90%) transparency with a lower electrical resistance than ITO;
- thin metal films or hybrid material alternatives, such as silver nanowires covered with graphene;
- inherently conductive polymers (ICPs) and conducting polymers, such as polyaniline and poly(3,4-ethylenedioxythiophene) polystyrene sulfonate (PEDOT:PSS); and
- amorphous transparent conducting oxides including, for example, aluminum, gallium or indium-doped zinc oxide (AZO, GZO or IZO).

The descriptions supra in respect of exemplary embodiments describes nano-confinement structures for molecules that are nano-grooves or nano-channels. However, based upon the molecule or molecules being confined, other nano-structure geometries may be employed including, but not limited to, square, rectangular, circular, elliptical, and polygonal. Equally, the aspect ratio of a lateral dimension of the nano-confinement structure relative to the thickness of the dielectric may vary according to the design of the overall device, the material being captured, and/or the processing etc. Accordingly, this aspect ratio of (Lateral/Depth) may vary from a value significantly less than 1, i.e. a structure being narrow in a lateral dimension and deep, to a value significantly more than 1, i.e. a structure having significant dimension across the surface relative to its depth or with shallow structures. Dimensions may vary from tens of nanometers laterally to tens or hundreds of microns.

Further, the cross-sectional geometry of a nano-confinement structure may not be constant in some embodiments. For example, a nanostructure may taper in width versus depth such that it is narrower at the electrode end and wider at the top of the dielectric or vice-versa. According to the material selection for the dielectric and its processing, the upper profile of the dielectric may be abrupt, tapered or continuously varying in a smooth manner, e.g. a reflowed glassy dielectric.

Within the embodiments described supra, the structure is described as being a lower planar electrode, a plurality of dielectric regions formed on the lower planar electrode, and an upper electrode disposed away from these. However, the lower planar electrode may be alternatively implemented as electrodes only between the "dielectric regions." These may be connected to one or a plurality of electrical contacts according to the particular design and performance requirements of the device within which the structures are employed. Optionally, the upper electrode may be implemented as a series of electrodes similarly connected to one or a plurality of electrical contacts according to the particular design and performance requirements of the device within which the structures are employed. Within some embodiments. the electrodes may be shaped on one or both of the upper and lower elements to provide a gradual introduction of the DEP force in a similar manner as the dielectric elements may be shaped to avoid snagging of the molecule during capture and/or release.

Optionally, a plurality of nano-structure and electrode geometries may be fabricated within a single molecular confinement structure according to some embodiments, wherein these are coupled to the same or different electrical excitation sources to selectively confine different molecules within the same molecular confinement structure. Optionally, a plurality of electrode structures may be employed for the same molecule but coupled to a plurality of electrical excitation sources such that once a predetermined confinement sequence has been completed, single electrode structures may be "de-activated", releasing the molecule or molecules confined with that single electrode structure. In this manner, multiple molecules of a predetermined target molecule may be confined but released singularly or in small groups as the plurality of electrode structures are "de-activated."

The descriptions supra in respect of exemplary embodiments describes nano-confinement structures for molecules that are nano-grooves or nano-channels wherein the molecules may be loaded and unloaded into the nano-structures through the DEP effect. However, in some embodiments, the DEP process may be employed to enhance and/or control the loading of the molecule(s) to binding materials and/or locations. For example, molecules may be immobilized to a capture material within the nano-structures, e.g. disposed above the electrode between the dielectric elements. According to the analyte being sensed, the capture material may be a luminophore, enzyme, antibody or aptamer, for example. In the case that the capture material is itself a luminophore and hence luminescent itself, then the additional provisioning of a fluorescent material may be omitted. In other instances the fluorescent marker may be introduced in post-processing. In some embodiments, a luminophore may be more akin to a phosphor and hence a fluorescent material/marker may be employed to shift the detection wavelength to a region away from the optical probe wavelength exciting the measurement system.

The descriptions supra in respect of exemplary embodiments describes nano-confinement structures for molecules that are nano-grooves or nano-channels wherein the molecules may be loaded and unloaded into the nano-structures through the DEP effect after the material has been introduced into the region above the nano-structures. Accordingly, within embodiments, the DEP molecular capture geometry may be formed discretely with direct loading or as part of a larger micro-fluidic diagnosis/characterization device and/or system.

Figure 7A:
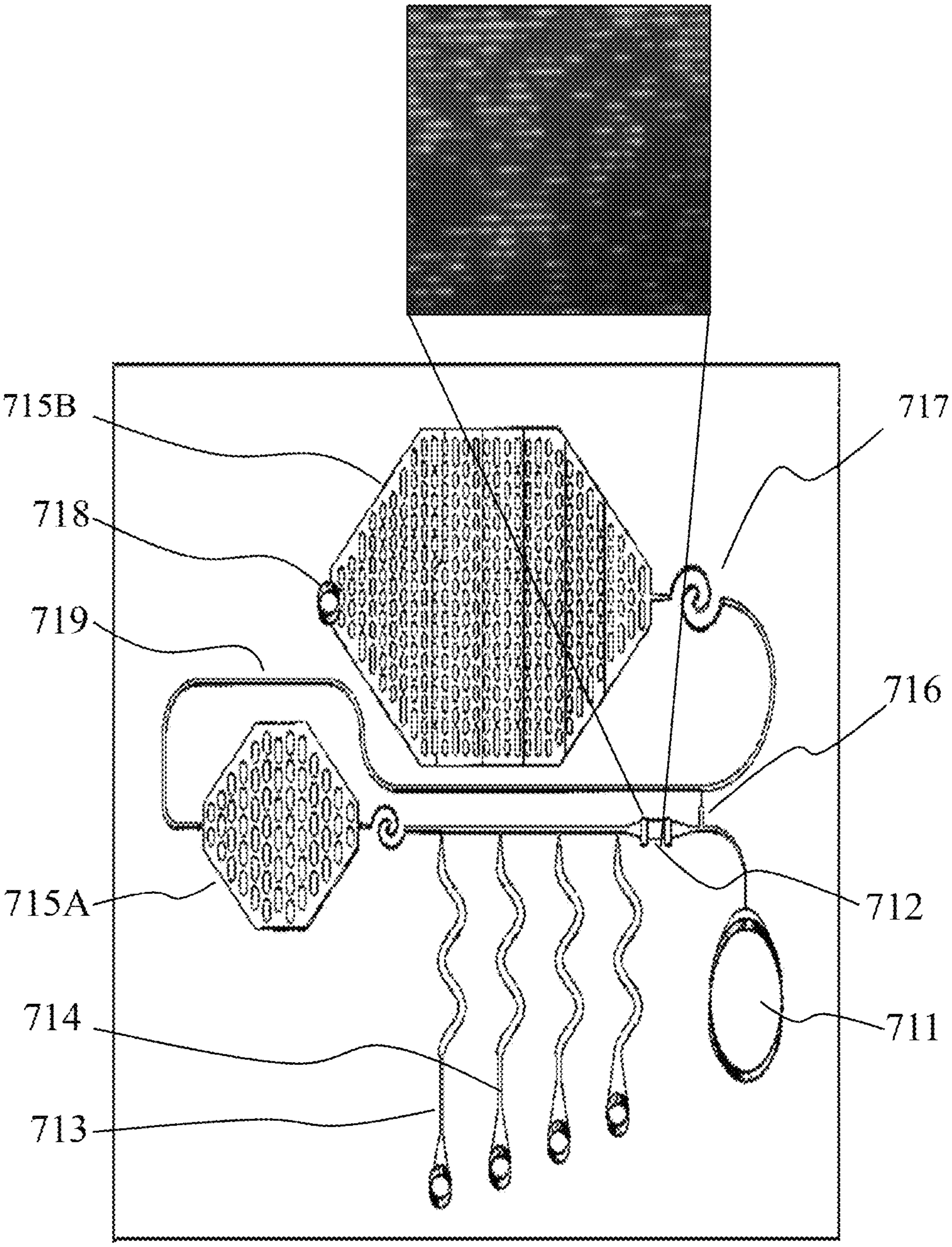
FIGS. 7A-7C depict an example of a micro-fluidic circuit comprising a detection zone exploiting DEP based molecular confinement according to one embodiment.
Figure 7B:
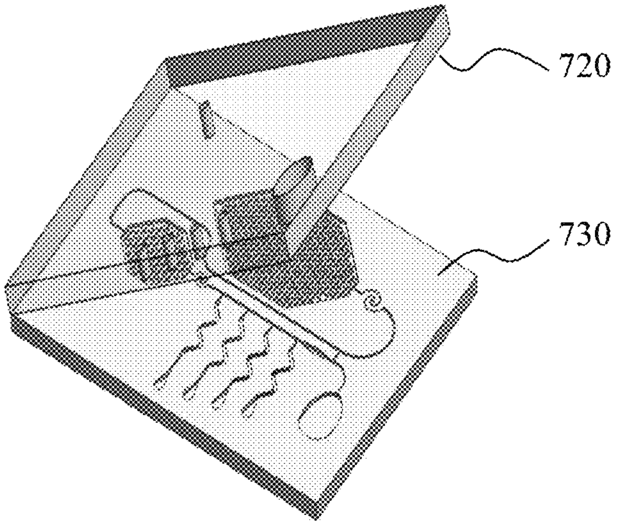
Figure 7C:
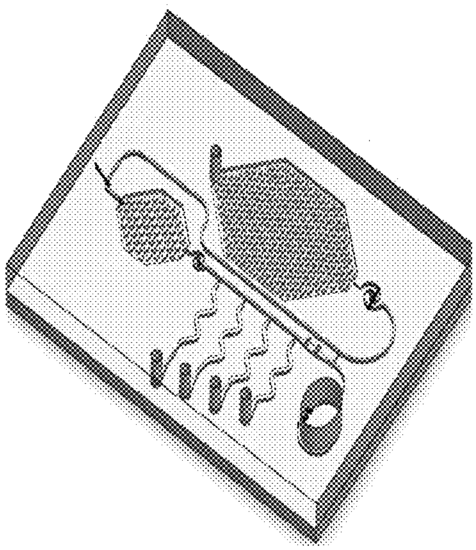
Figure 8A:
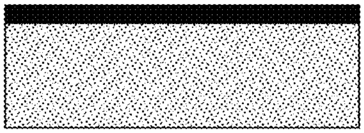
FIGS. 8A-8G depict an exemplary process flow for manufacturing a silicon substrate for a micro-fluidic circuit comprising a detection zone exploiting DEP based molecular confinement according to an embodiment.
Figure 8B:
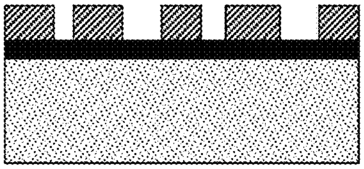
Figure 8C:
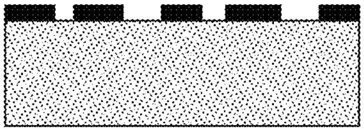
Figure 8D:
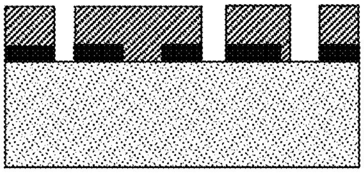
Figure 8E:
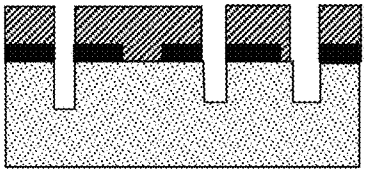
Figure 8F:
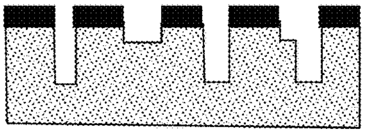
Figure 8G:
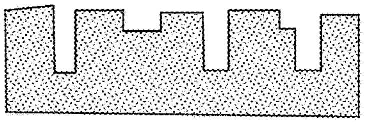

Microfluidic circuits (MICFLIC) may employ a range of micro-fluidic elements (MICFLELs) including, but not limited to, microfluidic conduits (or channels), flow routers, sequential programmable capillary retention valves (pCRVs) employing capillary retention valves (CRV), positive pressure programmable retention burst valves (pRBVs) employing retention burst valves (pRBVs) such as low pressure pRBV and high pressure RBV, programmable capillary trigger valves (pCTV) employing capillary trigger valves (CTV), flow resistors, vents, and programmable capillary pumps (pCPumps) employing symmetric and asymmetric capillary pumps (CPumps) such as low pressure CPump and high pressure CPump. Referring to FIG. 7A there is depicted a MICFLIC wherein a filler port 711 is coupled to a detection zone 712 wherein the main flow channel couples to four retention channels, wherein pCRVs such as first and second pCRVs 713 and 714 are implemented to retain fluid within the retention channels of which they form part. In doing so, the fluid fills the trigger channels within the capillary trigger valve (CTV) 716. The sample fluid then flows into capillary pump 715A which once filled couples to reverse channel 719 wherein when it passes CTV 716 it gets triggered. Due to the pressure at the other side of CTV 716, the fluids and/or reagents stored within the retention channels between detection zone 712 and capillary pump 715A, now empty via the detection zone through CTV 716, are drawn under action of the waste pump 715B. This MICFLIC, as depicted in FIG. 7B as substrate 730, may be assembled with a cover 720 with vent holes which when disposed atop forms the assembled device in FIG. 7C that now contains the etched MICFLEL structures such as detection zone, retention channels, capillary pump, reverse channel, waste pump, and CTV. The detection zone 712 would contain the nano-structures formed from the dielectric atop the lower electrode wherein the upper electrode is formed upon the cover 720 allowing the molecules to be confined by the DEP methodology described supra, after their insertion from the filler port 711 and then post-processed with the fluids loaded into the MICFLIC and released by the programmable capillary retention valves (pCRVs).

Referring to FIGS. 8A-8G there is depicted an exemplary process flow for manufacturing a silicon substrate for use in combination with a PDMS cover, for example, to provide a MICFLIC wherein the MICFLELs are primarily implemented within the silicon substrate. Accordingly the process begins at FIG. 8A wherein a silicon (Si) substrate 810 is coated with a layer of silicon dioxide 820 which may be for example thermally grown or deposited. Next at FIG. 8B, a layer of photoresist is deposited and patterned through a lithography process such that in FIG. 8C, the silicon dioxide 820 is etched. Next in FIG. 8D, a further photolithography process employing photoresist 830 is undertaken. The openings within the photoresist 830 are etched in FIG. 8E, resulting in etched channels within the Si substrate 810 to a first predetermined depth. Next the photoresist 830 is removed and a second etching process is undertaken in FIG. 8F, resulting in the continued etching of the initial openings but now also the openings within the silicon dioxide 820 defined in FIG. 8C. The silicon dioxide 820 mask is then removed in FIG. 8F, resulting in finished Si substrate 810 in FIG. 8G. The finished Si substrate 810 may then be subsequently exposed to additional processing, such as plasma processing for example, to provide hydrophilic regions whilst other regions may be treated with other materials to form hydrophobic regions, metallization, electrodes, etc. for example. The detection zone may be similarly formed through deposition of the electrode within the etched detection zone and the dielectric regions formed upon it to provide the nano-confinement structures. Similarly, the electrical connections to the electrode may be formed to contact pads or alternate structures for interconnecting to the external control circuit. Optionally, the dielectric regions are formed upon the silicon substrate and the electrode is merely "placed" in the regions between them through deposition and lift-off/etching. Accordingly, dual depth microfluidic elements are formed within the Si substrate 810 which are subsequently encapsulated with a cover, such as one implemented in PDMS for example or another silicon substrate.

The implementation of embodiments within a silicon substrate allows for the integration of not only micro-fluidic elements that are "self-powered" through micro-capillary action but for those employing microelectromechanical systems (MEMS) such as valves, pumps, motors, etc. and for devices with integrated CMOS electronics, optical sources, and optical detectors. Optionally, a silicon substrate may be disposed within a micro-fluidic device that cannot support the formation of the required nano-structures allowing, for example, low cost injection molded plastic micro-fluidic devices to be fitted with a precision nano-structured silicon based molecular confinement device.

Figure 9A:
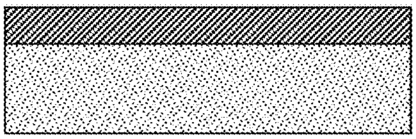
FIGS. 9A-9H depict an exemplary process flow for manufacturing a PMDS substrate for a micro-fluidic circuit comprising a detection zone exploiting DEP based molecular confinement according to an embodiment.
Figure 9B:
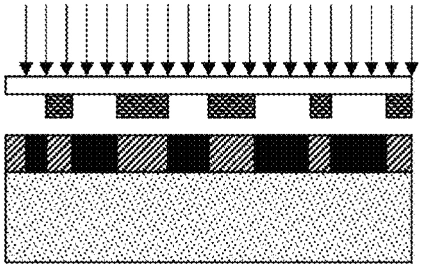
Figure 9C:
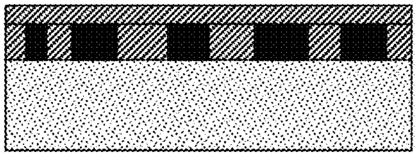
Figure 9D:
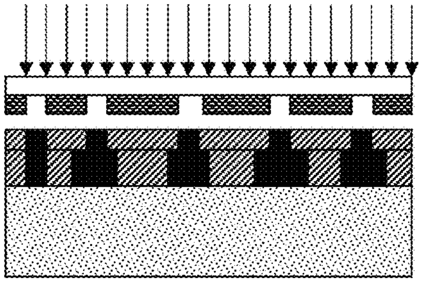
Figure 9E:
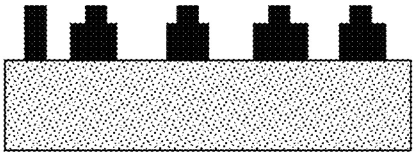
Figure 9F:
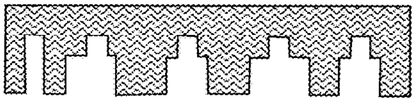
Figure 9G:
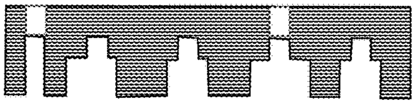
Figure 9H:
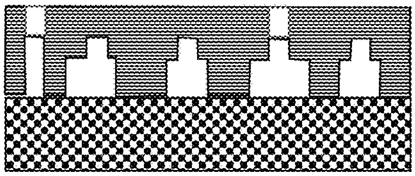

Referring to FIGS. 9A-9H, an exemplary process flow for a polydimethylsiloxane (PDMS) based MICFLIC is presented. In FIG. 9A, an uncrosslinked SU-8 layer 910 is deposited upon a substrate. Next in FIG. 9B, this uncrosslinked SU-8 layer 910 is exposed through optical lithography defining crosslinked SU-8 regions 920. This process is repeated in FIGS. 9C and 9D to provide two layers of cross-linked SU-8. SU-8 being an epoxy-based negative photoresist that is very viscous polymer and can be spun over various thicknesses and still be processed with standard contact lithography. The uncrosslinked SU-8 material is removed in FIG. 9E wherein the resulting crosslinked SU-8 920 forms the basis for a molding of hydrophobic PDMS 930 which may be spun or poured to form the molded element. Next in FIG. 9F the hydrophobic PDMS 930 is processed to provide hydrophilic PDMS 940 as shown in FIG. 9G and vent holes are formed. Next in FIG. 9H a sealing substrate 950 is attached to form the MICFLIC. Optionally, the vent holes may be implemented within the sealing substrate 950. In a similar manner as with the silicon substrate, the detection zone may be formed through deposition of the electrode within the etched detection zone and the dielectric regions formed upon it to provide the nano-confinement structures. Optionally, the dielectric regions are formed within the PDMS already and the electrode is merely placed in the “regions” between, through deposition and lift-off/etching. Similarly, the electrical connections to the electrode may be formed to contact pads or alternate structures for interconnecting to the external control circuit.

Figure 10A:
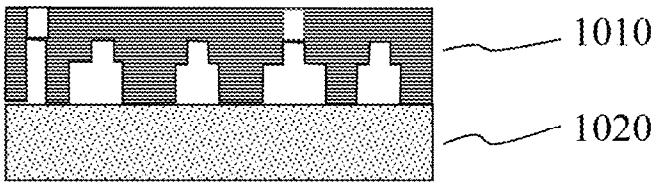
FIGS. 10A-10E depict an exemplary process flow for activating a MICFLIC employing a detection zone exploiting DEP based molecular confinement within a single use assay, according to an embodiment.
Figure 10B:
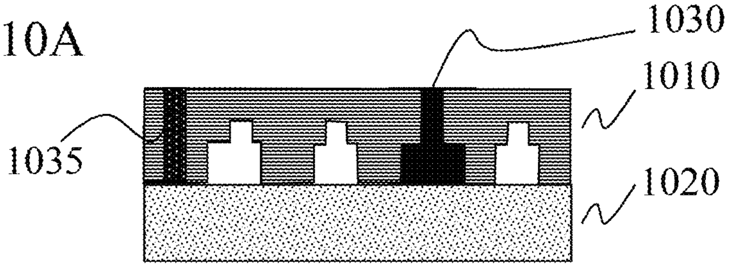
Figure 10C:
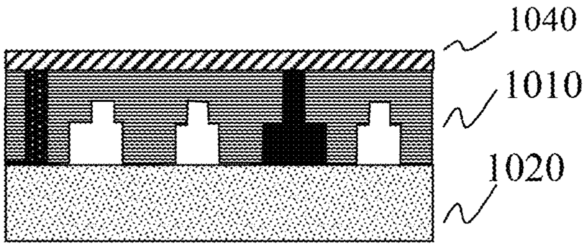
Figure 10D:
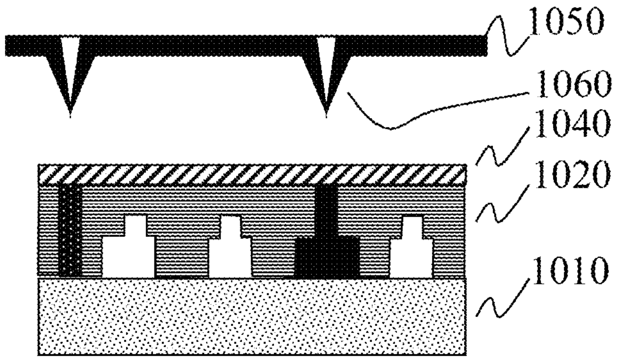
Figure 10E:
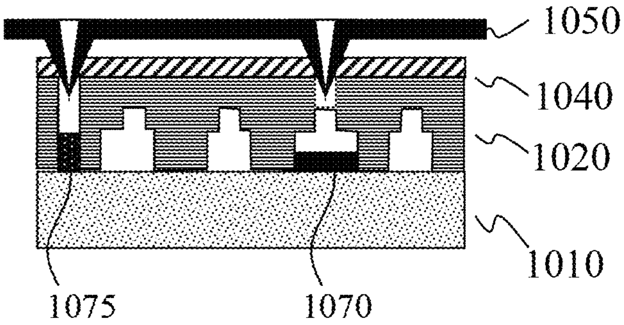

Referring to FIGS. 10A-10E, an exemplary process flow for activating a MICFLIC according to an embodiment is described, wherein the MICFLIC is a single use assay inserted into a POC device which provides the interfaces, electronics, logic, display etc., for example. Where a MICFLIC requires multiple washes, buffer solutions, reagents, antibodies etc. that provide these at the time of use of the POC device may detract from the benefits of self-powered self-regulating MICFLICs in some applications such as consumer driven measurements. Accordingly it such reservoirs and channels may be pre-filled prior to shipment of the MICFLIC and its attendant POC. However, as multiple vents are implemented within the MICFLIC assembly, such fluid elements may become contaminated, subject to evaporation, or even leak. In the exemplary process flow in FIGS. 10A-10E a MICFLIC comprising cover 1010 and substrate 1020, shown in FIG. 10A, is filled with the required reagents etc. as depicted by first and second reagents 1030 and 1035, respectively, in FIG. 10B. The filled MICFLIC is then sealed with a coating 1040 in FIG. 10C, wherein it may be stored, shipped and held ready for deployment. When inserted into the POC device, a cover plate 1050, shown in FIG. 10D, with hollow projections 1060 is brought down into contact with the MICFLIC, piercing the coating 1040 such that the vents are now opened to air, as per FIG. 10E. Optionally, low temperature waxes or other materials may be employed to seal vents wherein a thermal processing step opens the vents. Other approaches may be used, as understood by those skilled in the art, including the use of mechanical and electrically activated valves etc.

Figure 11A:
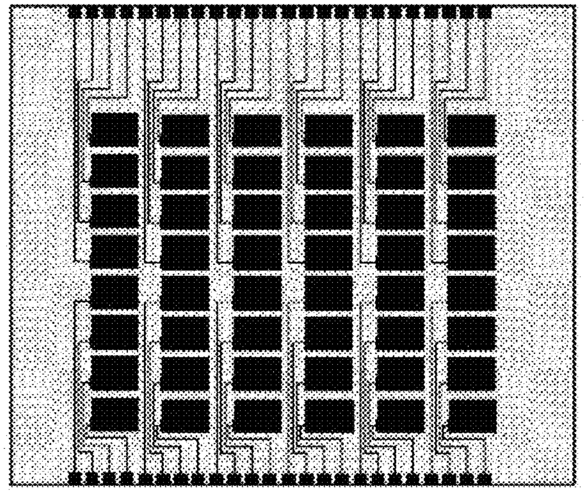
FIGS. 11A-11C depict an exemplary embodiment combining DEP molecular confinement methodology with electrophoretic manipulation of the molecules once confined.
Figure 11A:
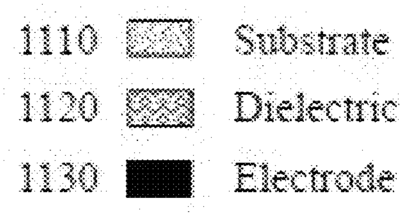
Figure 11B:
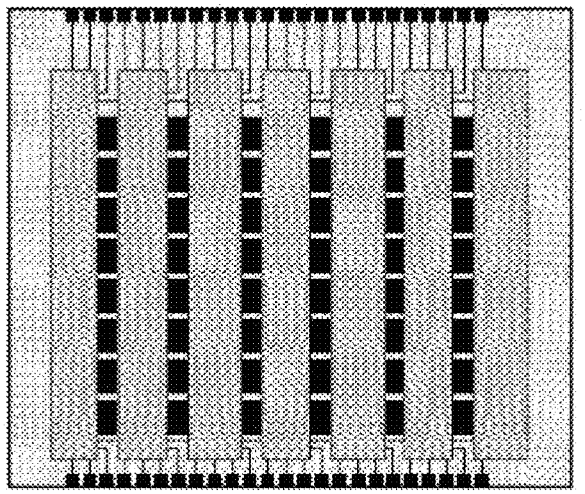
Figure 11C:
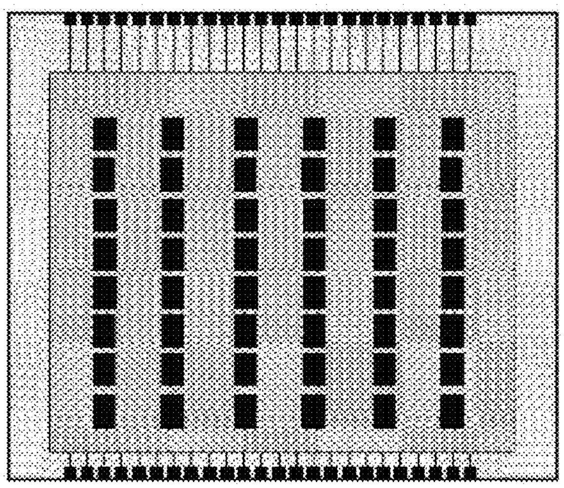

Now referring to FIGS. 11A-11C, there is depicted exemplary embodiments combining DEP molecular confinement methodology with electrophoretic (EP) manipulation of the molecules once confined. As depicted, FIG. 11A represents a plan view of the lower electrode 1130 of a DEP device prior to patterning of the dielectric 1120. As depicted, the lower electrode 1130 comprises a 6×8 matrix of electrodes which are individually interconnected to electrode pads at the edges. These are then coated with the dielectric 1120 as depicted in FIGS. 11B and 11C respectively, wherein the dielectric 1120 has been patterned to form nano-grooves or nano-openings respectively. Accordingly, a molecule may be initially contained/captured by operating the electrodes, in conjunction with the upper electrode, by exploiting the DEP effect as described herein.

Subsequently, the DEP may be selectively removed to a region or regions of the device in conjunction with fluidic flow such that the molecules are released and moved through fluidic pressure/hydrodynamic pressure across the device. Optionally, this may be sufficiently low pressure to move the molecules using the DEP effect in another region of the device, and sufficiently strong to capture/confine the molecules again. In this manner, for example, an initial large area DEP confinement region may be electrically/hydrostatically managed to move the molecules to a subsequent smaller area.

Optionally, through the electrodes, the DEP effect may be augmented/replaced with selective EP electrical actuation of the molecule in order to effect movement of the confined molecule(s) without exploiting hydrostatic actuation. Accordingly, through suitable electrical actuation of the matrix of electrodes, DEP confined molecules may be moved across the surface of the device in either direction according to the requirements of the device within which the combined DEP-EP structure is active. The exploitation of multiple electrodes per nano-groove or single electrodes per nano-pit may be determined by the dimensions of the confined molecule and/or its geometry. For example, a DNA molecule captured upon the pattern of FIG. 11B and extending along the nano-groove may be moved laterally to another nano-groove or moved along the nano-groove.

Optionally, the patterns of FIGS. 11B and 11C allow for selective release of molecules and the movement to another region of the micro-fluidic system under hydrostatic pressure as well as their release and movement within the nano-confinement structure with or without EP augmentation. Within other embodiments, the upper and/or lower electrodes may be augmented with nanostructures to enhance the EP effect. Optionally, the upper electrode may be continuous or may be similarly defined into a plurality of electrodes, e.g. linear electrodes for example to align with the nano-grooves within the pattern of FIG. 11B or a similar grid of electrodes such as depicted in the pattern of FIG. 11C such that the electrical potential is between different regions of the nano-confinement/capture devices.

Figure 12B:
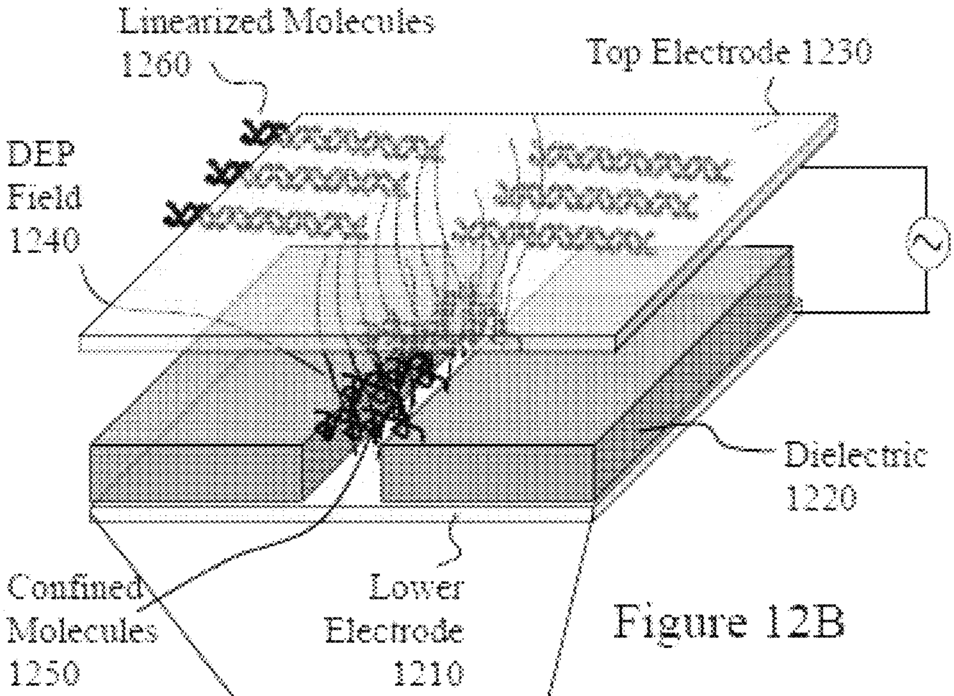
FIGS. 12A to 12D depict an exemplary embodiment with respect to a macro-geometric dimension DEP device for linearization and accumulation of single DNA molecules.
Figure 12A:
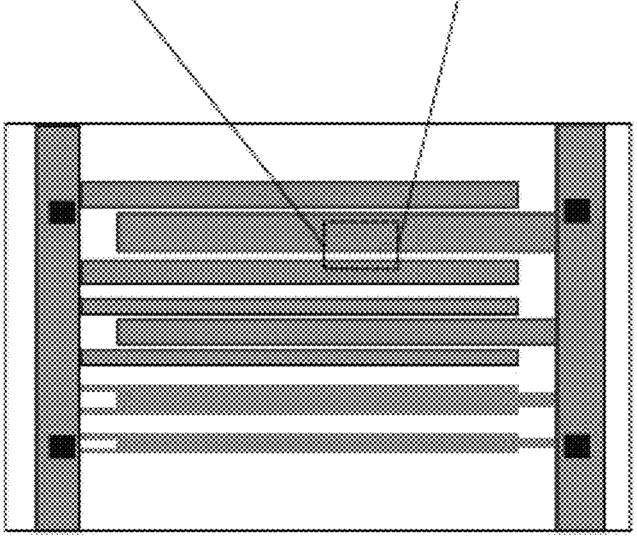
Figure 12D:
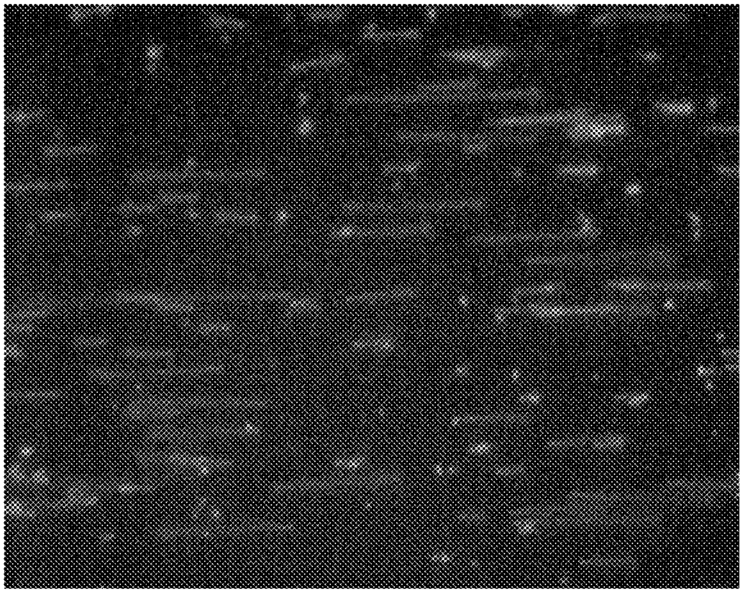
Figure 12C:
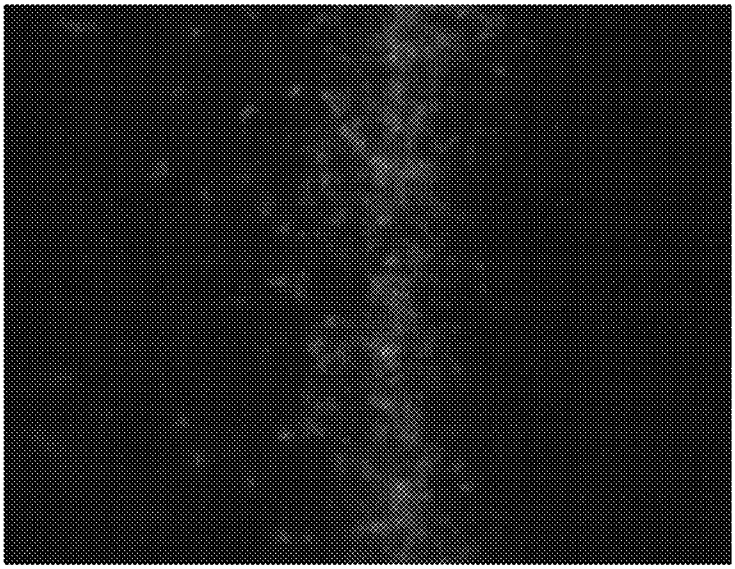

Now referring to FIGS. 12A to 12D, there is depicted an exemplary embodiment with respect to a macro-geometric dimension DEP device for linearization and accumulation of single DNA molecules. As depicted in FIGS. 12A (lower substrate plan view) and 12B (3D schematic), the device consists of a lower electrode pattern 1210, e.g. ITO, atop a substrate patterned with dielectric 1220, e.g. $Si_3N_4$, above which within the micro-fluidic assembly is an upper electrode pattern 1230, e.g. ITO. Accordingly, the DEP field 1240 may be employed to confine the molecules with respect to the nano-structures on the substrate, depicted as confined molecules 1250. Accordingly, these nano-structures may provide for accumulation (concentration) of the molecules within the structure as well as for their initial confinement such as depicted in FIG. 12C. Once confined, then the molecules, e.g. DNA molecules, may be immobilized and linearized, for example upon the upper ITO electrode, such as depicted in FIG. 12D. This linearization may arise as a physical result of the confinement of the molecules with respect to the dielectric structure of the plurality of dielectric structures within the nano-confinement device.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present invention.

The invention claimed is:

1. A confinement device for molecules comprising:

at least one first electrode having a first surface;

at least one second electrode having a second surface spaced from the first surface of the first electrode and forming a fluidic chamber therebetween;

at least one port extending through one of the at least one first electrode and the at least one second electrode and in fluid communication with the fluidic chamber; and a plurality of dielectric structures on the second surface arranged to form openings along the second surface, wherein application of an electrical signal across the at least one first electrode and the at least one second electrode generates a non-uniform electric field having electric field lines extending from the first surface of the at least one first electrode to the second surface of the at least one second electrode in the openings formed between the dielectric structures.

2. The device of claim 1, wherein at least one of the at least one first electrode and the at least one second electrode comprises a matrix of electrodes.

3. The device of claim 2, wherein electrodes in the matrix of electrodes are individually connected to electrode pads for selective application of an electrical signal.

4. The device of claim 1, further comprising at least one spacer between the at least one first electrode and one of the at least one second electrode and outer ones of the plurality of dielectric structures.

5. The device of claim 1, wherein at least one of the at least one first electrode and the at least one second electrode is composed of an optically transparent indium tin oxide.

6. The device of claim 1, wherein the at least one second electrode has a third surface opposite to the second surface, and further comprising a substrate in contact with the third surface.

7. The device of claim 1, further comprising a casing surrounding the at least one first electrode and the at least one second electrode, the casing composed of a transparent, biologically inert material.

8. The device of claim 1, wherein the openings formed along the second surface of the second electrode by the dielectric structures are channels that extend at least partially across the second surface.

9. The device of claim 1, wherein the second surface of the at least one second electrode is coated with a layer of dielectric material.

10. A method for manipulating molecules, the method comprising:

introducing at least one molecule into a fluidic chamber, the fluidic chamber formed inside a device comprising at least one first electrode having a first surface spaced from at least one second electrode having a second surface facing the first surface, the at least one second electrode having a plurality of dielectric structures arranged to form openings along the second surface; and applying at least one electrical signal across the at least one first electrode and the at least one second electrode to generate a non-uniform electric field having electric field lines extending from the first surface of the at least one first electrode to the second surface of the at least one second electrode in the openings formed between the dielectric structures, the at least one electrical signal having a frequency level causing the at least one molecule to move inside the fluidic chamber in accordance with a predetermined movement.

11. The method of claim 10, wherein applying the at least one electrical signal comprises selecting the frequency level to cause the at least one molecule to align with the electric field lines.

12. The method of claim 10, wherein applying the at least one electrical signal comprises selecting the frequency level to cause the at least one molecule to be driven and confined into the openings formed between the dielectric structures.

13. The method of claim 10, wherein applying the at least one electrical signal comprises selecting the frequency level to cause one of linearization and accumulation of the at least one molecule.

14. The method of claim 10, wherein applying the at least one electrical signal comprises selectively attracting and repelling the at least one molecule from regions of the fluidic chamber by varying the frequency level of the at least one electrical signal.

15. The method of claim 10, wherein applying the at least one electrical signal comprises applying multiple electrical signals to selectively displace different ones of the at least one molecule within the fluidic chamber.

16. The method of claim 10, wherein applying the at least one electrical signal comprises selectively applying the at least one electrical signal to different regions of the device to confine and release the at least one molecule as a function of a position in the fluidic chamber.

17. The method of claim 10, further comprising applying one of fluidic pressure and hydrodynamic pressure across the device to displace the at least one molecule within the fluidic chamber.

18. The method of claim 17, wherein applying one of fluidic pressure and hydrodynamic pressure across the device comprises first removing the at least one electrical signal to release the at least one molecule.

19. The method of claim 10, wherein applying at least one electrical signal comprises applying at least one first electrical signal to cause a dielectrophoretic force to act on the at least one molecule and applying at least one second electrical signal to cause an electrophoretic force to act on the at least one molecule.

20. The method of claim 19, wherein the at least one first electrical signal and the at least one second electrical signal are applied concurrently.

* * * * *